United States Patent
Hunt et al.

[11] 3,900,547
[45] Aug. 19, 1975

[54] APPARATUS AND METHOD FOR FORMING PELLETS

[75] Inventors: Harold R. Hunt; John W. Vanderveen, both of Bartlesville, Okla.

[73] Assignee: Phillips Petroleum Company, Bartlesville, Okla.

[22] Filed: July 19, 1973

[21] Appl. No.: 380,722

[52] U.S. Cl. ............... 264/117; 259/6; 23/214; 425/222
[51] Int. Cl. ............................................. C09c 1/56
[58] Field of Search ............. 259/5, 6, 71, 73, 102, 259/105; 23/314; 425/222, 449; 264/117

[56] References Cited
UNITED STATES PATENTS

| | | |
|---|---|---|
| 2,806,788 | 9/1957 | Leker .................................. 259/6 |
| 3,049,750 | 8/1962 | Austin ................................. 259/6 |

*Primary Examiner*—Harvey C. Hornsby

[57] ABSTRACT

A method and apparatus for forming carbon black pellets having preselected properties by first forming carbon black pellets in a wet pellet mill and thereafter adding only additional flocculent carbon black to the formed pellets, said additional carbon black being in an amount sufficient to increase the bulk density and hardness of said formed pellets.

7 Claims, 2 Drawing Figures

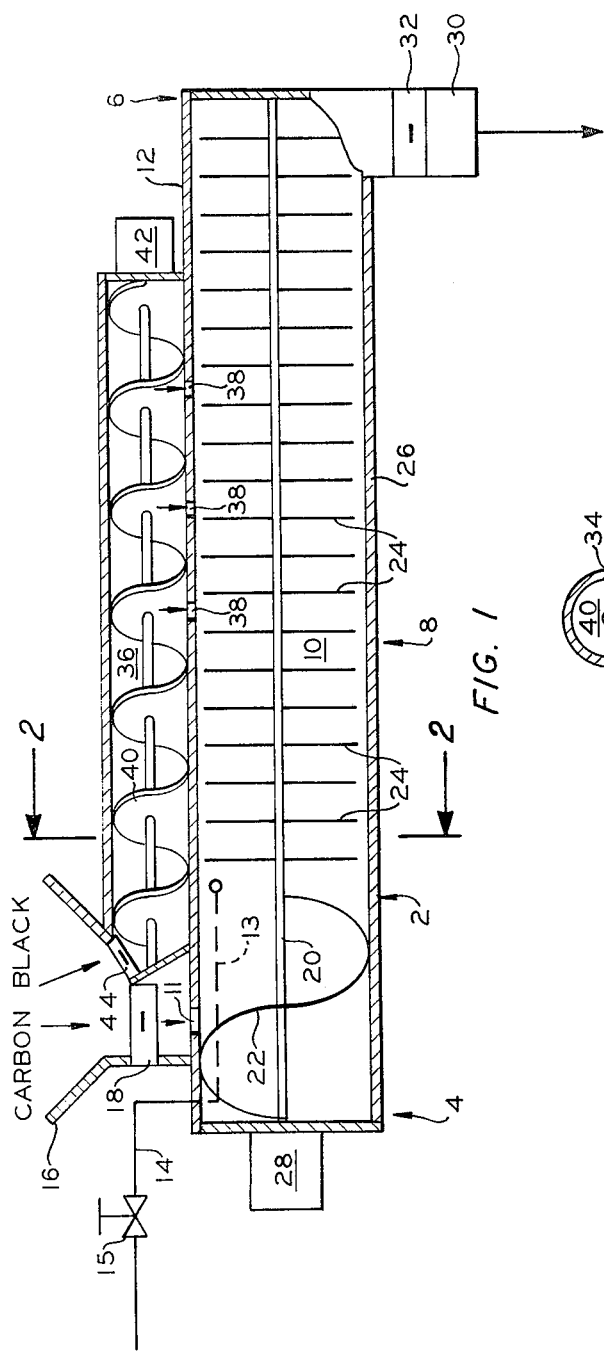
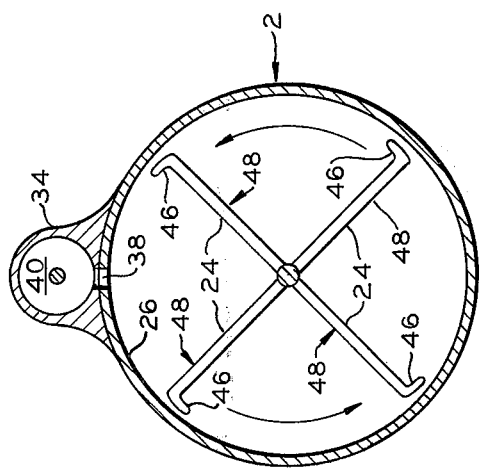

APPARATUS AND METHOD FOR FORMING PELLETS

It is desirable to provide apparatus and method for forming carbon black pellets having controlled, different physical properties, for example, increased bulk density and hardness.

As is known in the art, carbon black pellets can be used in the manufacture of rubber tires and other rubber and plastic items. For the varied uses of carbon black, it is often desirable to provide carbon black pellets having specific physical properties such as bulk density, hardness, and size distribution while maintaining the amount of water utilized at a low value. In the process of forming carbon black pellets, said formed pellets are dried which utilizes large amounts of labor, time, utilities, and equipment, and for this reason it is desirable to maintain the water of the process at a low volume and thereby realize a savings of time, labor, utilities and equipment.

This invention therefore resides in an apparatus and method for mixing water and carbon black pellets, forming carbon black pellets, and adding only additional flocculent carbon black to the formed pellets in an amount sufficient for forming resultant wet pellets having increased bulk density and hardness.

Other aspects, objects, and advantages of the present invention will become apparent from a study of the disclosure, the appended claims, and the drawing.

The drawings are diagrammatic views of example apparatus of this invention. FIG. 1 shows a partial longitudinal, sectional view of a wet mill pelleter and FIG. 2 shows a partial transverse, sectional view of the pelleter.

Referring to the drawings, a wet pelleter mill housing 2 has first and second end portions 4,6, a middle portion 8, and a chamber 10 extending therethrough. The middle portion 8 of the first housing 2 has spaced-apart openings 38 positioned along an upper portion 12 of the first housing's middle portion 8.

Means are provided at the first end portion 4 of the first housing 2 for controllably injecting streams of liquid and solids into the chamber 10. For example, a pipe 14 having a valve 15 can be utilized for controllably adding water or an aqueous pelleting liquid from a supply source (not shown) and a hopper 16 having a discharge valve 18, usually a rotary feeder, can be utilized for controllably adding carbon black to the chamber 10 via outlet 11. Usually, the aqueous solution 14 is added to the pelleter downstream of screw 22, as indicated by hidden conduit 13.

The chamber 10 can have an axle 20 extending longitudinally therethrough with a screw 22 or other conveying element positioned on the axle 20 at the first end portion of the chamber 10 and a plurality of scraping elements or pins 24 positioned along the axle 20 at the middle portion of the chamber 10 and extending generally radially outwardly from the axle 20 to a location immediately adjacent the walls 26 of the first housing 2. Pins 24 are preferably arranged on axle 20 to form a helix or double helix. One end of the axle 20 is connected to a power means 28, such as an electric motor for example, for rotating the axle 20 and associated screw 22 and pins 24 within the chamber 10 for moving and mixing the carbon black and pelleting liquid and formed pellets through the chamber 10 to the second end portion 6 at which location the wet pellets are removed through discharge outlet 30. Said discharge outlet 30 can have a valve 32, usually a rotary valve, positioned therein for controlling the flow of material from the chamber 10.

A second housing 34 is positioned on the upper portion 12 of the first housing 2 and extends along the middle portion 8 of said first housing 2. The second housing 34 has a chamber 36 in communication with the chamber 10 through spaced-apart openings 38 formed through the walls 26 of the first housing 2.

A feed screw 40 is positioned in the second housing chamber 36 and is attached to power means 42, for example an electric motor, for controllably rotating the feed screw 40 and injecting carbon black from the hopper 16 into the chamber 10 via openings 38.

It should be understood that other materials than carbon black and water or aqueous fluid can be used for pelleting in the apparatus, and that the second chamber 36 can be fed by hopper 16 or by separate hopper (not shown). Also, the solid material of hopper 16 can be the same or different than the solid material passing through the second chamber 36. However, in the method of this invention wherein carbon black pellets having minimum water content and having controlled physical properties are formed, it is preferred that the chambers 10, 36 be associated with a common hopper 16 for forming an apparatus of simple construction.

It should also be understood that the power means 28,42 can be variable speed power means and valves 15,18,32 and 44 can be provided for controlling the passage of material into and from the apparatus.

Referring to FIG. 2, it is preferred that at least a portion of the pins 24 have an angularly disposed end portion 46 extending from the pin body 48 generally in the direction of rotation of the axis 20. By so constructing the pins 24, particularly those which rotate adjacent openings 38, the material added to chamber 10 through said openings is more effectively moved through the openings and drawn into the chamber 10.

In the method of this invention, feed streams of water and flocculent carbon black, for example, are added to a wet pelleter mill to form a first mixture. Said materials are continuously added in amounts sufficient to form pellets in said mill. The amounts, as known in the art, may vary with the type of carbon black and rate of addition, but are rates and volumes easily determined by one skilled in the art after the specifications of the mill are known.

As the first mixture is agitated and moved through the chamber 10 of the mill, the carbon black pellets are formed.

At the middle portion 8, only additional flocculent carbon black is added to the formed pellets in an amount sufficient for forming resultant pellets, after drying, having increased bulk density and hardness. This amount of additional carbon black added incrementally is dependent upon the wetness of the formed pellets, but is generally in the range of not greater than about 60 weight percent of the carbon black feed stream of chamber 10. If greater than about 60 weight percent additional carbon black is added, the formed pellets will be destroyed rather than improved as described in this invention. The resultant pellets thereafter pass through the chamber 10 and are recovered therefrom via outlet 30, and charged to a drying step, not shown.

The amount of flocculent carbon black added via each opening 38 is less than about 15 weight percent of the flocculent black added to the pelleter via inlet 11 in order to maintain proper wet pellet formation.

In an operation wherein the pelleting apparatus is a batch type pelleter, the carbon black feed and water is agitated until pellets form and thereafter only the additional carbon black is added to the pellets and then further agitated for increasing the bulk density and hardness of the pellets.

The resultant examples show the control of carbon black pellet hardness, bulk density, and other physical properties by the method of this invention.

EXAMPLE

In a semicontinuous laboratory pelleting apparatus, the pin type pelleter was charged initially with 7 pounds of carbon black and 7.5 pounds of water. The mass was processed for 30 minutes. A sample of carbon black pellets was removed, dried, and tested (run 1). Then 0.7 pounds of loose black (no additional water) was added and the pelleter operated another 30 minutes and a sample of pellets was removed, dried and tested (run 2). Runs 3 through 8 were obtained in the same manner with 0.7 pound increments of loose carbon black being added (no water being added), pelleting for 30 minutes, and samples of wet pellets were removed, dried and tested. The data below show that pellets can be made wherein the carbon black to water weight rate ratio is about 65.6 to 34.4.

TABLE I

| Run Number | 1 | 2 | 3 | 4 | 5 | 6 | 7 | 8 |
|---|---|---|---|---|---|---|---|---|
| Wt. % Carbon Black | 48.6 | 51.2 | 53.9 | 57.7 | 59.9 | 61.7 | 64.5 | 65.6 |
| Wt. % Water | 51.4 | 48.8 | 46.1 | 42.3 | 40.1 | 38.3 | 35.5 | 34.4 |
| Dried Pellets | | | | | | | | |
| Bulk Density Lbs./cu. ft. | 23.8 | 24.4 | 25.5 | 26.4 | 26.4 | 25.2 | 26.2 | 26.1 |
| Screen Analysis, wt. % | | | | | | | | |
| 10 Mesh | 0.6 | 0.8 | 0.8 | 0.8 | 0.5 | 0.4 | 0.4 | 0.3 |
| 16 Mesh | 2.7 | 1.7 | 1.8 | 2.2 | 1.2 | 1.3 | 1.5 | 1.4 |
| 18 Mesh | 2.7 | 0.6 | 0.7 | 0.8 | 0.4 | 0.5 | 0.7 | 0.7 |
| 30 Mesh | 13.3 | 4.7 | 2.8 | 2.9 | 1.9 | 2.4 | 3.5 | 5.0 |
| 60 Mesh | 78.5 | 91.8 | 93.1 | 93.2 | 94.6 | 89.0 | 83.8 | 77.0 |
| 120 Mesh | 2.4 | 0.6 | 1.0 | 0.3 | 1.4 | 5.4 | 8.4 | 12.4 |
| Pan | 0.2 | 0.1 | 0.1 | 0.1 | 0.1 | 0.9 | 2.1 | 3.4 |
| Total | 100.4 | 100.3 | 100.3 | 100.3 | 100.1 | 99.9 | 100.6 | 100.2 |
| Hardness | 69.8 | 75.6 | 83.0 | 86.3 | 82.2 | 77.8 | 80.3 | 81.6 |
| DBP, cc/100 gm | 107.5 | 104.0 | 101.7 | 100.3 | 98.7 | 97.2 | 95.7 | 93.5 |
| 24M4 DBP, cc/100 gm | 93.6 | 93.6 | — | — | — | — | 89.4 | 88.4 |
| Total Mixer Run, Min. | 30 | 60 | 90 | 120 | 150 | 180 | 210 | 240 |
| RPM of Shaft | 420 | 420 | 420 | 420 | 420 | 420 | 420 | 420 |
| Temperature, °F | 100 | 100 | 100 | 100 | 100 | 100 | 100 | 100 |

The flocculent carbon black charged to the pelleter had a nitrogen surface area, $N_2SA$, $m^2/gm$, of 98; and a 24M4 dibutylphthalate absorption (DBP cc/100 gm) of 94.4.

The photelometer was about 90.

The pellets were dried to contain less than about 1 percent water by weight by heating to about 400°F in the presence of air.

The pelleter was about 18 inches long and about 8 inches in diameter. The pins on the rotating shaft were one-half inch in diameter, and the clearance between the pins and the shell was about one-eighth inch.

| Test Methods | |
|---|---|
| DBP | — ASTM D 2414-65T. |
| 24M4 | — U.S. 3,548,454 with ASTM D2414-65T. |
| $N_2SA$ | — Method described by D. E. Smith in Petroleum Engineer, November, 1952, page 206. |

-continued

| Test Methods | |
|---|---|
| Photelometer | — ASTM D-1618-58T. |

When the pelleter was charged with carbon black and water in the carbon black to water weight ratio of about 61.5 to 38.5 (even more water than in the invention) pellets did not form.

The apparatus and method of this invention can form proper pellets with less water than conventionally required which allows higher throughput of carbon black through the pelleter and less load on the dryer.

Other modifications and alterations of this invention will become apparent to those skilled in the art from the foregoing discussion, example, and accompanying drawing, and it should be understood that this invention is not to be unduly limited thereto.

What is claimed is:

1. A wet carbon black pellet mill, comprising:

a first housing having first and second end portions, a middle portion, and a chamber extending therethrough, said chamber having spaced-apart openings along an upper portion of said middle portion;

first means positioned at the first end portion of the first housing for controllably injecting streams of an aqueous pelleting liquid and flocculent carbon black into said chamber;

second means for mixing and moving the injected material through said chamber;

third means positioned at the second end portion of the first housing for recovering formed carbon black pellets from said chamber;

a second housing having a second chamber and extending along the upper portion of the first housing, said second housing chamber being in communication with the openings of the first housing, one end of said second chamber adapted to receive flocculent carbon black;

a feed screw positioned in the second housing chamber for controllably injecting additional flocculent carbon black through the openings of the first housing in an amount such that the resulting wet carbon black pellets have a higher carbon black-to-water ratio than the respective ratio of the pellets to which the additional carbon black is added; and fourth means for rotating the feed screw.

2. An apparatus, as set forth in claim 1, wherein the second means comprises:

a rotatable axle extending through the middle portion of the first housing; and a plurality of scraping elements extending generally radially outwardly from the axle to a location immediately adjacent said first housing, at least a portion of said elements having an angularly disposed end portion extending in the direction of rotation of the axle.

3. An apparatus, as set forth in claim 1, wherein the chambers of the first and second housing are in communication with a common carbon black source.

4. In a method for forming carbon black pellets comprising adding a feed stream of an aqueous liquid to a wet pellet mill, adding a feed stream of flocculent carbon black to said mill, forming a mixture of said feed stream in a ratio of carbon black and liquid sufficient to form pellets of wet carbon black in said mill, agitating said mixture for forming wet carbon black pellets, recovering the wet carbon black pellets and drying said carbon black pellets;

the improvement which comprises adding additional flocculent carbon black to the wet carbon black pellets formed;

mixing the wet pellets formed and the added carbon black and forming wet carbon black pellets with a higher carbon black-to-water ratio than the respective ratio of the pellets to which the additional carbon black has not been previously added; and thereafter recovering the wet carbon black pellets and drying them.

5. A method, as set forth in claim 4, wherein the additionally added carbon black is not greater than about 60 weight percent of the carbon black feed stream.

6. A method, as set forth in claim 4, wherein the mill is a continuous pelleter and the additional carbon black is added to the mill at spaced locations along the length of the mill downstream of the entry location of the feed streams.

7. A method in accordance with claim 4 wherein said flocculent carbon black in the second pelleting step is added in a quantity sufficient to form wet carbon black pellets having such a carbon black water weight ratio that a mixture of flocculent carbon black and water having the same carbon black to water weight ratio would not form pellets in the first pelleting step.

* * * * *